(12) United States Patent
Doi (10) Patent No.: US 8,338,036 B2
(45) Date of Patent: Dec. 25, 2012

(54) ALL-SOLID-STATE BATTERY AND MANUFACTURING METHOD THEREOF

(75) Inventor: Takayoshi Doi, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 12/673,782

(22) PCT Filed: Feb. 4, 2009

(86) PCT No.: PCT/JP2009/051851
§ 371 (c)(1),
(2), (4) Date: Apr. 30, 2010

(87) PCT Pub. No.: WO2010/089855
PCT Pub. Date: Aug. 12, 2010

(65) Prior Publication Data
US 2011/0281160 A1    Nov. 17, 2011

(51) Int. Cl.
*H01M 4/64*    (2006.01)
(52) U.S. Cl. ......... 429/304; 429/130; 429/152; 429/247
(58) Field of Classification Search ................... 429/304, 429/130, 152, 247
See application file for complete search history.

(56) References Cited

U.S. PATENT DOCUMENTS

| | | |
|---|---|---|
| 2001/0041290 A1 | 11/2001 | Morigaki et al. |
| 2004/0185336 A1 | 9/2004 | Ito et al. |
| 2008/0217078 A1 | 9/2008 | Kobayashi et al. |

FOREIGN PATENT DOCUMENTS

| | | |
|---|---|---|
| CN | 1323075 A | 11/2001 |
| CN | 101262046 A | 9/2008 |
| JP | A-7-57716 | 3/1995 |
| JP | A-2002-157990 | 5/2002 |
| JP | A-2002-329530 | 11/2002 |
| JP | A-2004-179091 | 6/2004 |
| JP | A-2004-273436 | 9/2004 |
| JP | A-2005-294168 | 10/2005 |
| JP | A-2006-261008 | 9/2006 |
| JP | A-2008-027660 | 2/2008 |

OTHER PUBLICATIONS

Office Action issued in Korean Patent Application No. 10-2010-7004655 dated Sep. 14, 2011 (with translation).
International Search Report issued on Mar. 24, 2009 in International Application No. PCT/JP2009/051851 (with translation).

*Primary Examiner* — Jane Rhee
(74) *Attorney, Agent, or Firm* — Oliff & Berridge, PLC (57) ABSTRACT

An all-solid-state battery, and manufacturing method thereof. The all-solid-state battery has a plurality of laminated bodies including: a cathode layer; an anode layer; and a solid electrolyte layer sandwiched therebetween, when neighboring two laminated bodies are defined as a first and second laminated body, the solid electrolyte layer of the first and second laminated body being connected through an insulating layer, to a pair of side surfaces of the laminated plurality of the laminated bodies, a first current collector which is connected with the cathode layer but not connected with the anode layer and a second current collector which is connected with the anode layer but not connected with the cathode layer being arranged respectively, a plurality of insulating layers connected to the solid electrolyte layers being arranged between the cathode layer and the second current collector and between the anode layer and the first current collector.

4 Claims, 3 Drawing Sheets

ALL-SOLID-STATE BATTERY AND MANUFACTURING METHOD THEREOF

TECHNICAL FIELD

The present invention relates to an all-solid-state battery and a manufacturing method thereof.

BACKGROUND ART

Lithium-ion secondary battery has features that the energy density is higher than other secondary batteries and operation at high-pressure is feasible. Therefore, it is used as a secondary battery which is capable of reducing its size and weight for information equipment such as cellular phone. Recently, demand of lithium-ion secondary battery for a power source of large-sized apparatus such as hybrid car is increasing.

The lithium-ion secondary battery comprises: a cathode layer; an anode layer; and an electrolyte disposed therebetween, wherein the electrolyte is composed of nonaqueous liquid or solid substances. When a nonaqueous liquid (hereinafter, refer to as "electrolytic solution".) is used as the electrolyte, the electrolytic solution permeates inside the cathode layer. So, interface with an electrolyte and a cathode active material constituting the cathode layer is easily formed, thereby the performance of the battery can be easily improved. However, widely used electrolytic solution is flammable so that it is necessary to mount a system to secure its safeness. On the other hand, solid electrolyte is nonflammable; thereby the above system can be simplified. Hence, a lithium-ion secondary battery having a mode which comprises a nonflammable solid electrolyte (hereinafter, refer to as "solid electrolyte layer".) has been proposed.

In the case of lithium-ion secondary battery (hereinafter, refer to as "compact all-solid-state battery".) in which a solid electrolyte layer is disposed between a cathode layer and an anode layer, since the cathode active material and the electrolyte are solid, the electrolyte is hard to be permeated inside the cathode active material; whereby interface between the cathode active material and the electrolyte tends to decrease. Therefore, in the case of compact all-solid-state battery, by using, as a cathode layer, a cathode mixture layer containing a mixed powder having a powder of cathode active material and a-powder of solid electrolyte, area of the interface has been increased.

As an art related to secondary battery, for example, Patent document 1 discloses a battery comprising: a separator for battery having a-pleated-sheet structure; a group of electrodes, wherein a plurality of the electrodes (cathode or anode) are disposed in each of the recessed portion on one side of the separator and other electrodes (anode or cathode) are disposed in each of the recessed portion on the opposite side of the separator. In addition, Patent document 2 discloses a sheet-type battery, wherein a plurality of cathode sheet having a sheet-type cathode current collector to which a cathode active material is applied and a plurality of anode sheet having a sheet-type anode current collector to which an anode active material is applied are laminated alternately across a separator or a solid electrolyte layer, wherein the separator or the solid electrolyte layer are bent in a zig-zag manner as if the separator or the solid electrolyte layer is to thread its way through the cathode sheets and anode sheets. Moreover, Patent document 3 discloses a rectangular battery, in which a plurality of sheet-type positive plates and negative plates are respectively facing and alternately superposed through a separator, wherein at least positive plates or negative plates are successively packaged by a substantially tape-shape separator and folded along the fusion-bonding part of the separators between the electrode plates.

Patent Document 1: Japanese Patent Application Laid-Open (JP-A) No. 2002-157990
Patent Document 2: JP-A No. 2002-329530
Patent Document 3: JP-A No. 07-057716

DISCLOSURE OF THE INVENTION

Problems to be Solved by the Invention

In the art of Patent document 1, a plurality of electrodes (cathode or anode) are disposed in each of the recession of one side of the separator (for battery) which is bent in a pleated manner; and other electrodes (anode or cathode) are disposed in each of the recessed portion on the opposite side of the separator. However, this structure makes it difficult to raise power density of the battery, which is problematic. While, if electrode area is extended to raise power density, the fastening force increases, which is also a problem. Even if the art of Patent document 1 and the arts of Patent documents 2 and 3 are combined, it has been difficult to solve these problems.

Accordingly, an object of the present invention is to provide an all-solid-state battery which is capable of raising power density and inhibiting increase of fastening force and to provide the manufacturing method thereof.

Means For Solving The Problems

The present invention uses the following means to solve the above problems. In other words, the first aspect of the invention is an all-solid-state battery comprising a plurality of laminated bodies each of which comprises: a cathode layer; an anode layer; and a solid electrolyte layer arranged between the cathode layer and the anode layer, when neighboring two laminated bodies optionally selected from the plurality of laminated bodies are defined as a first laminated body and a second laminated body, the plurality of laminated bodies being stacked such that the cathode layer of the first laminated body and the cathode layer of the second laminated body are in contact with each other, or such that the anode layer of the first laminated body and the anode layer of the second laminated body are in contact with each other, the solid electrolyte layer of the first laminated body and the solid electrolyte layer of the second laminated body being connected through an insulating layer, to a pair of side surface of stacked plurality of the laminated bodies, a first current collector which is connected with the cathode layer but is not connected with the anode layer and a second current collector which is connected with the anode layer but is not connected with the cathode layer being arranged respectively, a plurality of insulating layers connected to the solid electrolyte layers being arranged between the cathode layer and the second current collector and between the anode layer and the first current collector.

The second aspect of the invention is a method for manufacturing all-solid-state battery comprising the steps of: forming a plurality of insulating layers on a base material at intervals; after forming the insulating layers, forming a plurality of electrolyte layers in at least a plurality of gaps between the neighboring insulating layers; after forming the electrolyte layers, forming electrode layers, wherein a plurality of cathode layers are formed at intervals on one side of the base material including a surface of the solid electrolyte layer formed between the plurality of insulating layers, a plurality of anode layers are formed at intervals on the other side of the base material including the surface of the solid electrolyte layer formed between the plurality of insulating layers; folding the base material at the both ends of the insulating layers as creases; and arranging current collectors, wherein a first current collector is arranged to be in contact with the cathode layer but not to be in contact with the anode layer and a second current collector is arranged to be in connect with the anode layer but not to be in contact with the cathode layer.

The term "base material" means a material which is: capable of maintaining solid state at manufacturing the all-solid-state battery, capable of enduring environment at the operation of all-solid-state battery, and capable of making ions permeated therein. As long as these requirements are satisfied, its mode is not specifically limited. Typical mode of the base material may be a woven or fibrous sheet having substantially slit or lattice porous.

Effects of the Invention

According to the all-solid-state battery of the present invention, a plurality of laminated bodies are stacked such that facing anode layers of the neighboring laminated bodies or facing cathode layers of the neighboring laminated bodies are in contact with each other. So, even if number of the laminated body is increased to extend the electrode area, it is capable of constantly keeping the area to which fastening force is imparted constant. Therefore, in the invention, by constantly keeping the area to which fastening force is imparted, it is capable of inhibiting increase of fastening force. In addition, according to the invention, by raising the number of laminated body, the electrode area is extended, thereby possible to raise the power density. Accordingly, the present invention can provide an all-solid-state battery which can raise the power density while inhibiting increase of fastening force.

By the method for manufacturing the all-solid-state battery of the present invention, it is possible to manufacture the all-solid-state battery of the invention through a step of folding the base material on which a plurality of laminated bodies are formed at intervals. As described above, the all-solid-state battery can raise power density while inhibiting increase of fastening force. Hence, the invention can provide a method for manufacturing the all-solid-state battery which is capable of raising power density while inhibiting increase of fastening force.

DESCRIPTION OF THE REFERENCE NUMERALS

S1 insulating layer forming step
S2 electrolyte layer forming step
S3 electrode layer forming step
S4 folding step
S5 current collector disposing step
1 cathode layer
2 anode layer
3 solid electrolyte layer
4 laminated body
5 insulating layer
6 first current collector
7 second current collector
8 terminal portion
8a layer
9 current collecting foil (current collecting portion)
10 all-solid-state battery
11 mesh-sheet base material (base material)
12 interval

BEST MODE FOR CARRYING OUT THE INVENTION

Hereinafter, the present invention will be described with reference to the drawings. It should be noted that the modes shown below are examples of the present invention so that the invention is not limited by those modes.

1. All-Solid-State Battery

Figure 1:
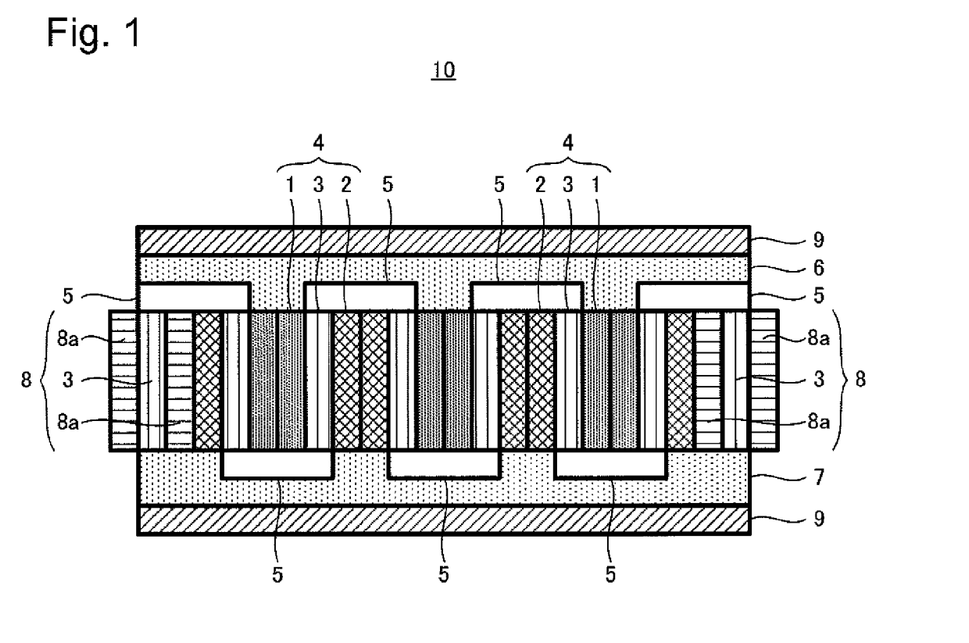
FIG. 1 is a cross-sectional view showing an example mode of all-solid-state battery 10.

FIG. 1 is a cross-sectional view showing an example mode of all-solid-state battery 10 of the invention. FIG. 1 picks up only a part of all-solid-state battery 10 in a magnified form. It should be noted that FIG. 1 omits a part of reference numerals.

As shown in FIG. 1, the all-solid-state battery 10 comprises a plurality of laminated bodies 4, 4, . . . . In the all-solid-state battery 10, the laminated body 4 comprises: a cathode layer 1 having a cathode active material where lithium ions go in and out; an anode layer 2 having an anode active material where lithium ions go in and out; and a solid electrolyte layer 3 arranged between the cathode layer 1 and the anode layer 2. The solid electrolyte layers 3, 3 of the neighboring two laminated bodies 4, 4 are connected by an insulating layer 5. The neighboring two laminated bodies 4, 4 are stacked such that facing anode layers 2, 2 for respectively constituting the laminated bodies 4, 4 or facing cathode layers 1, 1 for respectively constituting the laminated bodies 4, 4 are in contact with each other. About the all-solid-state battery 10, to a pair of side surface of the stacked laminated bodies 4, 4, . . . (the upper and lower side surfaces to the sheet of FIG. 1), a first current collector 6 and a second current collector 7 are respectively arranged. The first current collector 6 is in contact with the cathode layers 1, 1, . . . but is not in contact with the anode layers 2, 2, . . . . The first current collector 6 and the anode layers 2, 2, . . . are separated by the insulating layers 5, 5, . . . . On the other hand, the second current collector 7 is in contact with the anode layers 2, 2, . . . but is not in contact with the cathode layers 1, 1, . . . ; meanwhile, the second current collector 7 and the cathode layers 1, 1, . . . are separated by the insulating layers 5, 5, . . . . In the all-solid-state battery 10, terminal portions 8, 8 are disposed at the right and left ends to the sheet of FIG. 1; current collecting foils 9, 9 are disposed at the upper and lower ends to the sheet of FIG. 1 and fastening force is imparted through the terminal portions 8, 8. Namely, in the all-solid-state battery 10, lithium ions are moved in the right-and-left direction to the sheet and electrons are moved in the vertical direction to the sheet; then, the electric current is collected using current collecting foils 9, 9 arranged at the upper and lower ends to the sheet of FIG. 1. Hereinafter, the all-solid-state battery 10 will be described on the component-basis.

<Cathode Layer 1>

The cathode layer 1 comprises: a cathode active material; a solid electrolyte; and an electrical conducting material, these are homogenously mixed through binder. When thickness of the cathode layer 1 is called "t1", except for the right and left ends in FIG. 1, in the all-solid-state battery 10, since the neighboring laminated bodies 4, 4 are stacked such that the facing cathode layers 1, 1 or the facing anode layers 2, 2 of the neighboring laminated bodies 4, 4 are in contact with each other, a total thickness of the cathode layers 1, 1 sandwiched by the pair of solid electrolyte layers 3, 3 is, apparently, "2×t1". However, in the all-solid-state battery 10, the solid electrolyte layers 3, 3 are arranged on the free ends of two of the cathode layers 1, 1. As a consequent, lithium ions existing in the cathode layers 1, 1 can travel back and forth between the cathode layers 1, 1 and the solid electrolyte layers 3, 3 which respectively constitute the laminated bodies 4, 4 together with the mating cathode layers 1, 1. As it were, lithium ions existing inside the cathode layer 1 which is located at the right side of the contact interface of two of the cathode layers 1, 1 can travel back and forth between the cathode layer 1 and the solid electrolyte layer 3 located on the right side of the contact interface; while, lithium ions existing inside the cathode layer 1 which is located at the left side of the contact interface can travel back and forth between the cathode layer 1 and the solid electrolyte layer 3 located on the left side of the contact interface. Thus, in the all-solid-state battery 10, it becomes possible to control the maximum travel distance of lithium ions traveling inside the cathode layers 1, 1 to "t1".

<Anode Layer 2>

The anode layer 2 comprises: an anode active material; a solid electrolyte; and an electrical conducting material, these are homogenously mixed through binder. When thickness of the anode layer 2 is called "t2", except for the right and left ends to the sheet of FIG. 1, in the all-solid-state battery 10, since the neighboring laminated bodies 4, 4 are stacked such that the facing cathode layers 1, 1 or the facing anode layers 2, 2 of the neighboring laminated bodies 4, 4 are in contact with each other, a total thickness of the anode layers 2, 2 sandwiched by the pair of solid electrolyte layers 3, 3 is, apparently, "2×t2". However, in the all-solid-state battery 10, the solid electrolyte layers 3, 3 are arranged on the free ends of two of the anode layers 2, 2. As a consequent, lithium ions existing in the anode layers 2, 2 can travel back and forth between the anode layers 2, 2 and the solid electrolyte layers 3, 3 which respectively constitute the laminated bodies 4, 4 together with the mating anode layers 2, 2. As it were, lithium ions existing inside the anode layer 2 which is located at the right side of the contact interface of two of the anode layers 2, 2 can travel back and forth between the anode layer 2 and the solid electrolyte layer 3 located on the right side of the contact interface; while, lithium ions inside the anode layer 2 which is located at the left side of the contact interface can travel back and forth between the anode layer 2 and the solid electrolyte layer 3 located on the left side of the contact interface. Thus, in the all-solid-state battery 10, it becomes possible to control the maximum travel distance of lithium ions traveling inside the anode layers 2, 2 to "t2".

<Solid Electrolyte Layer 3>

The solid electrolyte layer 3 contains a solid electrolyte which exhibits lithium ion conductivity but does not exhibit electrical conductivity. Except for the right and left ends of the all-solid-state battery 10, the solid electrolyte layer 3 is not in contact with the first current collector 6 and the second current collector 7. It should be noted that since the solid electrolyte layer 3 does not exhibit electrical conductivity, even if the solid electrolyte layer 3 is in contact with the first current collector 6 and/or the second current collector 7 at the right and left ends of the all-solid-state battery 10, there is no problem.

<Laminated Body 4>

The laminated body 4 comprises: a cathode layer 1, an anode layer 2; and a solid electrolyte layer 3 sandwiched between the cathode layer 1 and the anode layer 2. The all-solid-state battery 10 has a plurality of laminated bodies 4, 4, . . . ; these are stacked such that the facing cathode layers 1, 1 or the facing anode layers 2, 2 of the neighboring laminated bodies 4, 4 are in contact with each other by folding at the both ends of below-described insulating layers 5, 5, . . . as creases.

<Insulating Layer 5>

The insulating layer 5 is connected to the solid electrolyte layer 3. The insulating layer 5 in the all-solid-state battery 10 is composed of a flexible and dense insulating material. Since the material is flexible, the insulating layers 5, 5, . . . can be folded at the both ends thereof as creases. In addition, as the insulating layer 5 is composed of a dense material, the insulating layers 5, 5, . . . are capable of inhibiting contact of the below-described first current collector 6 with the anode layers 2, 2, . . . and contact of the second current collector 7 with the cathode layers 1, 1, . . . .

<First Current Collector 6>

The first current collector 6 contains an electrical conductive powder. By containing the electrical conductive powder, even if the ends of cathode layers 1, 1, . . . are curved, contact with the cathode layers 1, 1, . . . can be secured. In the all-solid-state battery 10, the first current collector 6 is in contact with the cathode layers 1, 1, . . . but is not in contact with the anode layers 2, 2, . . . . Between the anode layers 2, 2, . . . and the first current collector 6, the insulating layers 5, 5, . . . are arranged.

<Second Current Collector 7>

The second current collector 7 contains an electrical conductive powder. By containing the electrical conductive powder, even if the ends of anode layers 2, 2, . . . are curved, contact with the anode layers 2, 2, . . . can be secured. In the all-solid-state battery 10, the second current collector 7 is in contact with the anode layers 2, 2, . . . but is not in contact with the cathode layers 1, 1, . . . . Between the cathode layers 1, 1, . . . and the second current collector 7, the insulating layers 5, 5, . . . are arranged.

<Terminal Portion 8>

The terminal portion 8 comprises: a solid electrolyte layer 3; and lithium ion nonconductive/electrical nonconductive layers 8a, 8a. To improve the performance of the all-solid-state battery 10, it is necessary to reduce interfacial resistance at the contact interface between the cathode active material and the solid electrolyte and interfacial resistance at the contact interface between the anode active material and the solid electrolyte. For reducing interfacial resistance, it is effective to impart to the contact interface a pressure equal to or more than the predetermined level and to adhere tightly the cathode active material and the solid electrolyte as well as the anode active material and the solid electrolyte. So, the terminal portions 8, 8 are arranged at both right and left ends of the all-solid-state battery 10 and fastening force is imparted through the terminal portions 8, 8. It should be noted that the pressure (surface pressure) imparted to the contact interface is related to the amount of fastening force and area of the face to which fastening force is imparted. In other words, when a surface pressure equal to or more than the predetermined level is secured, the larger the area to which fastening force is imparted becomes, the higher the fastening force must be. Although the all-solid-state battery 10 has a plurality of cathode layers 1, 1, . . . and a plurality of anode layers 2, 2, . . . , these are folded at the both ends of the insulating layers 5, 5, . . . as creases; thereby the area of the face to which fastening force is imparted can be kept constantly regardless of increase number of the cathode layers 1, 1, . . . and the anode layers 2, 2, . . . . Hence, according to the all-solid-state battery 10, even when the number of laminated bodies 4, 4, . . . (number of the cathode layers 1, 1, . . . and the anode layers 2, 2, . . . ) are increased for the purpose of raising power density, it is not necessary to raise fastening force. Therefore, the all-solid-state battery 10 can secure a constant surface pressure regardless of number of the laminated bodies 4, 4, . . . , by imparting constant fastening force.

When the height of all-solid-state battery 10 in the back-front direction of FIG. 1 sheet is called "H"; the length of the cathode layers 1, 1, . . . and the anode layers 2, 2, . . . in the vertical direction of FIG. 1 sheet is called "W"; the number of the cathode layers 1, 1, . . . and the anode layers 2, 2, . . . contained in the all-solid-state battery 10 is called "N"; and the surface pressure necessary for fastening is called "δ" (delta), a total electrode area S of the cathode layer or anode layer contained in the all-solid-state battery 10 is: $S = H \times W \times N$.

When the cathode layers and the anode layers having the total electrode area are formed on both sides of the non-folded sheet-type composition, the fastening force F' to be imparted becomes: $F' = \delta \times H \times W \times N$.

On the other hand, the fastening force F to be imparted to the all-solid-state battery 10 becomes: $F = \delta \times H \times W$.

As a consequence, the all-solid-state battery 10 is possible to reduce the fastening force down to 1/N, compared with an all-solid-state battery having a non-folded sheet-type composition on which same area of the cathode layers and the anode layers are formed.

<Current Collecting Portion 9>

The current collecting portion 9 is in contact with the first current collector 6 or the second current collector 7. In the all-solid-state battery 10, the current collecting portion 9 being in contact with the first current collector 6 functions as a positive electrode and the other current collecting portion 9 being in contact with the second current collector 7 functions as a negative electrode. Namely, in the all-solid-state battery 10, the current collecting portions 9, 9 function as external output terminals. It should be noted that in the invention, when the structures each of which is sandwiched by the pair of current collecting portions 9, 9 are laminated in the vertical direction to the sheet of FIG. 1, the current collecting portions 9, 9 are at least arranged along the upper and lower ends of the stacked plurality of structures, respectively. The current collecting portion 9 is not necessary to be arranged between the structures laminated each other.

In the all-solid-state battery 10, the cathode active material contained in the cathode layer 1 may be a known cathode active material usable for a lithium-ion secondary battery having a solid electrolyte layer. Specific examples of the cathode active material contained in the cathode layer 1 includes an active material containing 50 mass % or more of $LiCoO_2$.

Moreover, in the all-solid-state battery 10, the solid electrolyte contained in the cathode layer 1 and the anode layer 2 may be a known solid electrolyte usable for a lithium-ion secondary battery having a solid electrolyte layer. Specific examples of the solid electrolyte contained in the cathode layer 1 and the anode layer 2 include $LiPF_6$ and $Li_7P_3S_{11}$.

Further, in the all-solid-state battery 10, the electrical conducting material contained in the cathode layer 1 and the anode layer 2 may be a known electrical conducting material usable for a cathode layer of a lithium-ion secondary battery having a solid electrolyte layer. Specific examples of the electrical conducting material contained in the cathode layer 1 and the anode layer 2 include fibrous carbon material represented by carbon nanotubes or carbon black compact. In the above description, cathode layer 1 and the anode layer 2 containing the electrical conducting material are, exemplified; the present invention is not limited to the above modes, the invention may utilize a cathode layer and a anode layer both of which do not contain the electrical conducting material. In view of forming a mode which is capable of easily reducing electron-conductivity resistance while securing passage of electrons traveling in the vertical direction to the FIG. 1 sheet, it is preferable to use the cathode layer and the anode layer containing the electrical conducting material.

In the all-solid-state battery 10, the lithium ion conductivity of the solid electrolyte contained in the cathode layer 1 is called "σLi" [S/cm]; the volume fraction of the cathode active material contained in the cathode layer 1 is called "CLi" [%]; the electron conductivity of the electrical conducting material contained in the cathode layer 1 is called "σe⁻" [S/cm]; the volume fraction of the electrical conducting material contained in the cathode layer 1 is called "Ce⁻" [%]; the thickness of the cathode layer 1 is called "t1" [mm]; and the width of the cathode layer 1 (length in the vertical direction to the sheet of FIG. 1) is called "W1" [mm]. In this circumstance, by satisfying relations of the following Formula 1 among them, it is possible to control the range which the electron-conductivity resistance does not exceed the lithium ion conductivity resistance. The following Formula 1 is on the basis of sufficiently high electron conductivity compared with lithium ion conductivity. The following Formula 1 is a relation to be satisfied by the all-solid-state battery 10 which does not cause increase of internal resistance and which enables higher-capacity and speed-up of charge and discharge, even when lithium ions which is poorly conducted compared with electrons are conducted in the right-and-left direction to the FIG. 1-*sheet* and electrons which are easily conducted compared with lithium ions are conducted in the vertical direction to the FIG. 1-*sheet*.

$$(W1/t1)^2 \leq (Ce^- \times \sigma e^-)/(CLi \times \sigma Li) \quad \text{(Formula 1)}$$

In the same manner, by using the thickness "t2" of the anode layer 2 and the width "W2" of the anode layer 2, the following Formula 2 can be derived.

$$(W2/t2)^2 \leq (Ce^- \times \sigma e^-)/(CLi \times \sigma Li) \quad \text{(Formula 2)}$$

For example, in case of: $\sigma e^- = 50$ [S/cm], $Ce^- = 10$ [%], $\sigma Li = 0.01$ [S/cm], $CLi = 30$ [%], and $t1 = t2 = 0.1$ [mm], the values derived from these conditions become $W1 \leq 4.08$ mm, $W2 \leq 4.08$ mm. When a current collecting foil and the like is inserted at the contact interface of a pair of cathode layers 1, 1 to be laminated and/or contact interface of a pair of anode layers 2, 2 to be laminated, it is capable of reducing the electron-conductivity resistance. Therefore, in this case, even if the width of the cathode layer 1 and anode layer 2 are set to be greater than that of the upper limit of the above relation, an all-solid-state battery, which causes no increase of internal resistance and enables speed-up of charge and discharge, can be provided. However, if the current collecting foil is inserted into the contact interface, the total volume and mass of the all-solid-state battery increase; whereby increase effect of the power density tends to be degraded. Thus, in view of forming a mode which is capable of inhibiting increase of fastening force and of increasing power density, it is preferable to have a mode where a current collecting foil or the like is not inserted into the contact interface of a pair of cathode layers 1, 1 to be laminated and the contact interface of a pair of anode layers 2, 2 to be laminated.

Still further, in the all-solid-state battery 10, the anode active material contained in the anode layer 2 may be a known anode active material usable for a lithium-ion secondary battery having a solid electrolyte layer. Specific examples of anode active material contained in the anode layer 2 include graphitizable coke and non-graphitizable carbon material.

In the all-solid-state battery 10, the solid electrolyte contained in the solid electrolyte layer 3 may be a known solid electrolyte usable for a lithium-ion secondary battery having a solid electrolyte layer. Specific examples of the solid electrolyte contained in the solid electrolyte layer 3 include $Li_2S$-$P_2S_3$.

In the all-solid-state battery 10, the insulating material contained in the insulating layer 5 is not specifically limited as long as it is not only a flexible and dense insulating material but also a material having properties sufficient enough to endure operational environment of the all-solid-state battery 10. Specific examples of the insulating material contained in the insulating layer 5 include: polyolefin-based material (polypropylene (PP), polyethylene (PE)) and polyethylene terephthalate (PET)-based material.

In the all-solid-state battery 10, specific examples of the electrical conductive powder constituting the first current collector 6 and the second current collector 7 include carbon powder.

In the all-solid-state battery 10, the layer 8a composing the terminal portion 8 may be composed of a material which is lithium ion nonconductive and electrical nonconductive and which has properties sufficient enough to endure operational environment of the all-solid-state battery 10. Specific examples of the material include: polyolefin-based material (polypropylene (PP), polyethylene (PE)) and polyethylene terephthalate (PET)-based material.

In the all-solid-state battery 10, the current collecting portion 9 can be composed of a known material that is capable of composing an external output terminal in a lithium-ion secondary battery having a solid electrolyte layer. The mode of the current collecting portion 9 is not specifically restricted; it may be in a form of current collecting foil or a current collecting sheet.

2. Manufacturing Method of the All-Solid-State Battery

Figure 2:
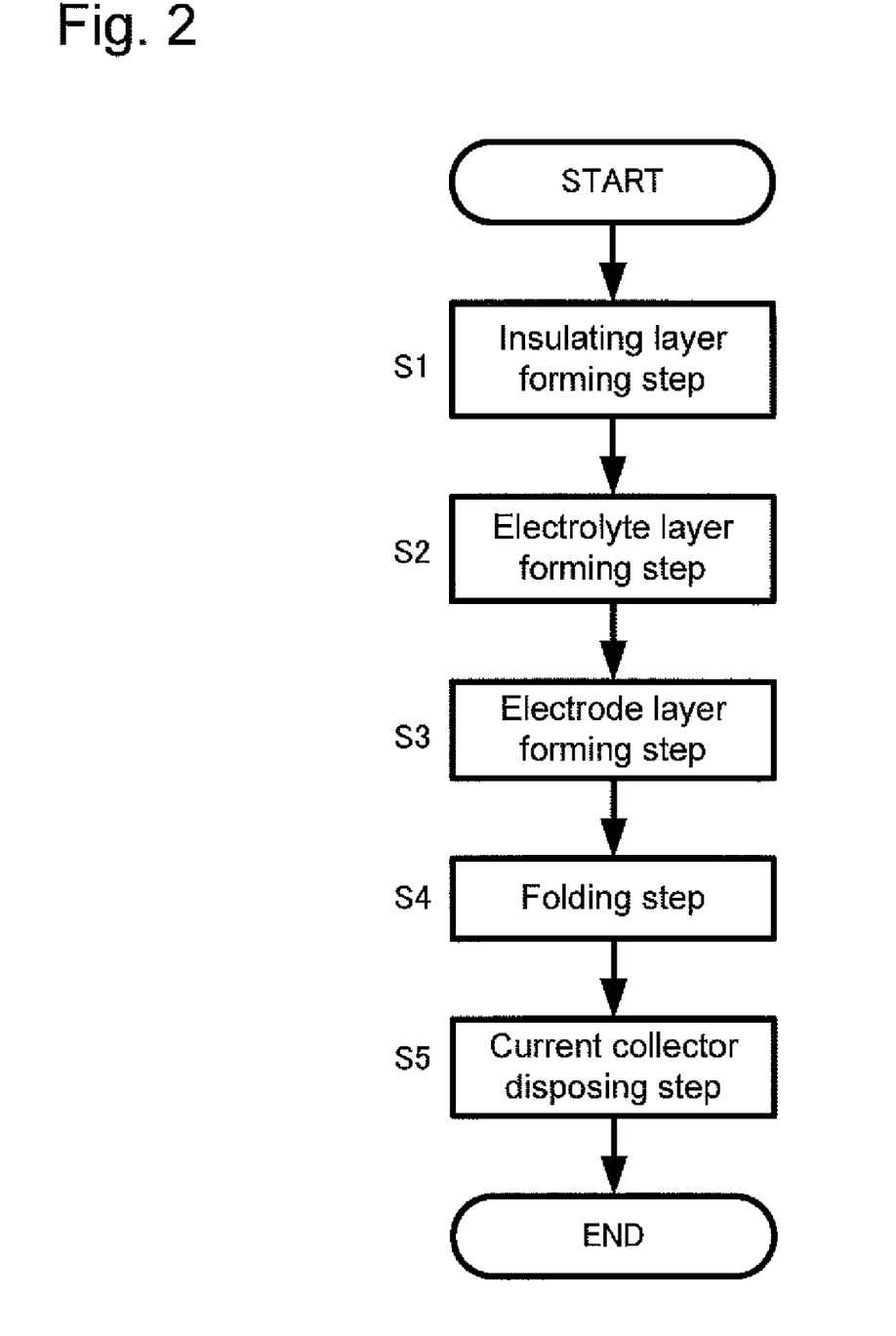
FIG. 2 is a flow chart showing order of steps included in the manufacturing method of the all-solid-state battery.
Figure 3:
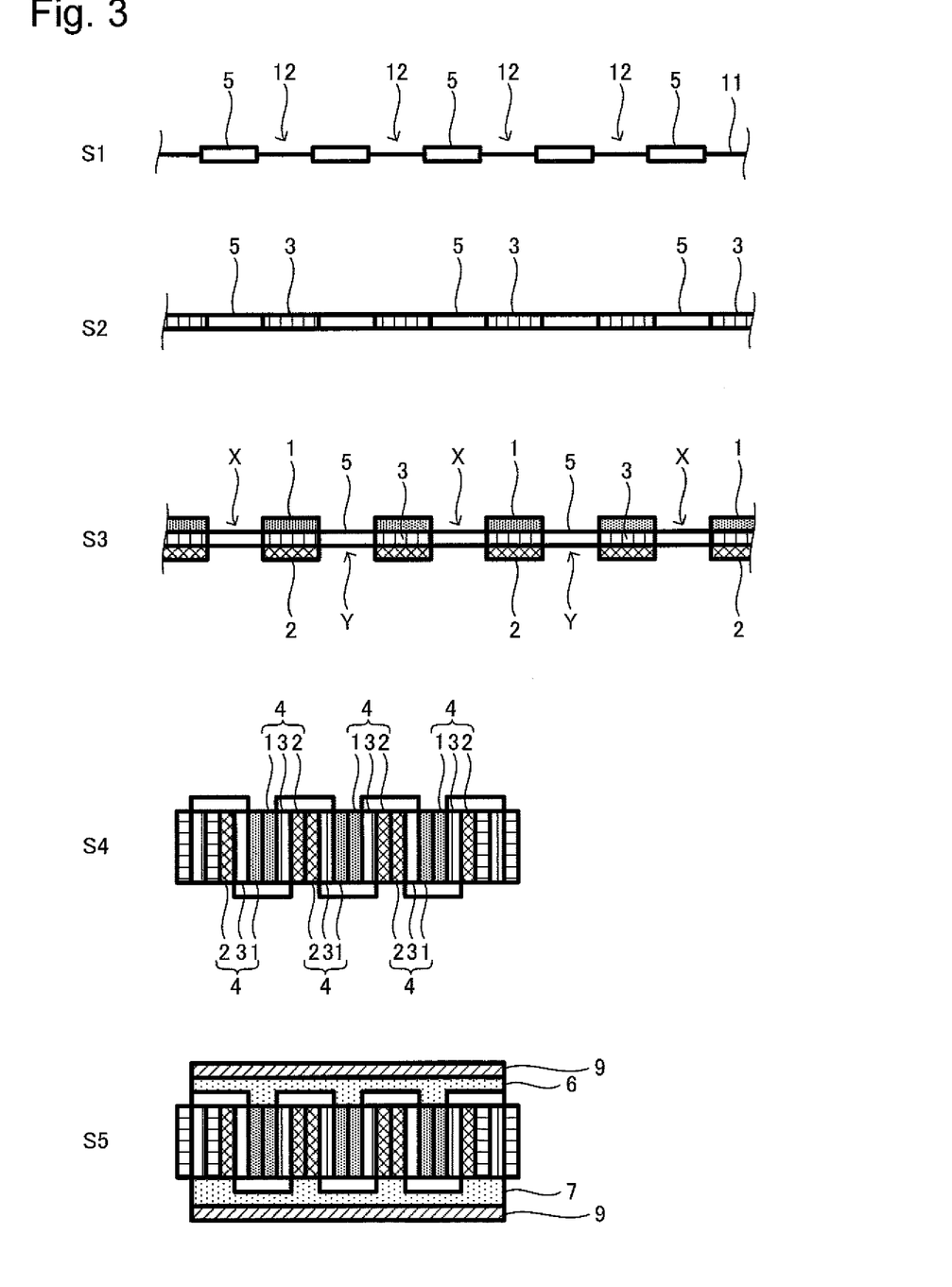
FIG. 3 is a simplified plan showing the manufacturing method of the all-solid-state battery.

FIG. 2 is a flow chart showing order of steps included in the manufacturing method of the all-solid-state battery of the invention. FIG. 3 is a simplified plan showing the manufacturing method of the all-solid-state battery of the invention. In FIG. 3, apart of reference numerals are omitted. In addition, in FIG. 3, components having the same structure as those of the all-solid-state battery 10 are shown by the same reference numerals as those used in FIG. 1; and the description is appropriately omitted.

Hereinafter, the method for manufacturing the all-solid-state battery of the present invention will be described with reference to FIGS. 1 to 3.

As shown in FIGS. 2 and 3, the method for manufacturing the all-solid-state battery of the invention comprises: an insulating layer forming step (S1); an electrolyte layer forming step (S2); an electrode layer forming step (S3); a folding step (S4); and a current collector disposing step (S5). Through the steps S1 to S5, the all-solid-state battery 10 of the invention is produced. Each step will be described below.

<Step S1>

Step S1 is a process to form a plurality of the insulating layers 5, 5, . . . at intervals 12, 12, . . . on a mesh-sheet base material 11 having a plurality of pores. In Step S1, for example, by applying a solution, in which an insulating material constituting the insulating layers 5, 5, . . . is dissolved, to a mesh-sheet base material 11 in a regular pattern and by volatilizing the solvent, a plurality of insulating layers 5, 5, . . . can be formed at intervals 12, 12, . . . .

<Step S2>

Step S2 is a process, after Step S1, to form a plurality of the solid electrolyte layers 3, 3, . . . in at least a plurality of gaps between the neighboring insulating layers 5, 5, . . . . In Step S2, for example, by applying a solution, in which a solid electrolyte constituting solid electrolyte layers 3, 3, . . . , to a portion of a mesh-sheet base material 11 to which the insulating layers 5, 5, . . . has not yet been applied and by volatizing the solvent, a plurality of the solid electrolyte layers 3, 3, . . . can be formed between both ends in the longitudinal direction (i.e. ends located at the right and left sides to the sheet of FIG. 3. Hereinafter, same as this.) of the mesh-sheet base material 11 and between the insulating layers 5, 5, . . . . By forming the solid electrolyte layers 3, 3, . . . in this manner, a member alternately having the insulating layers 5, 5, . . . and the solid electrolyte layers 3, 3, . . . can be formed without causing gap.

<Step S3>

Step S3 is a process, after Step S2, to form the plurality of cathode layers 1, 1, . . . at intervals on one side of the mesh-sheet base material 11 including the surface of the solid electrolyte layers 3, 3, . . . formed between the plurality of insulating layers 5, 5, . . . and to form the plurality of anode layers 2, 2, . . . at intervals on the other side of the mesh-sheet base material 11 including the surface of the solid electrolyte layers 3, 3, . . . formed between the plurality of insulating layers 5, 5, . . . . In Step S3, for instance, by forming the cathode layers 1, 1, . . . on one side only (the upper side to the sheet of FIG. 3) of all the solid electrolyte layers 3, 3, . . . formed in Step S2, except the solid electrolyte layers 3, 3 formed at the both ends in the longitudinal direction of the mesh-sheet base material 11 and by forming the anode layers 2, 2, . . . on the other side only, opposite side where the cathode layers 1, 1, . . . are formed, (the lower side to the sheet of FIG. 3) of the solid electrolyte layers 3, 3, . . . , a plurality of laminated bodies 4, 4, . . . can be formed. In Step S2, when forming the solid electrolyte layers 3, 3, . . . at only the area where the insulating layers 5, 5, . . . are not formed, the solid electrolyte layers 3, 3, are formed at intervals. Therefore, by forming the cathode layers 1, 1, . . . on one side of the solid electrolyte layers 3, 3, . . . and forming the anode layers 2, 2, . . . on the opposite side of the solid electrolyte layers 3, 3, . . . , the plurality of cathode layers 1, 1, . . . and the plurality of anode layers 2, 2, . . . can be formed at intervals. In Step 53, the plurality of cathode layers 1, 1, . . . can be formed, for example, by applying a solution, in which constituent materials of the cathode layers 1, 1, . . . : i.e. a cathode active material, solid electrolyte, electrical conducting material, and binder are dispersed, to one side of the solid electrolyte layers 3, 3, . . . and by volatizing the solvent. In addition, in Step S3, a plurality of anode layers 2, 2, . . . can be formed, for example, by applying a solution, in which constituent materials of the anode layers 2, 2, . . . : i.e. anode active material, solid electrolyte, electrical conducting material, and binder are dispersed, to the other side of the solid electrolyte layers 3, 3, . . . and by volatizing the solvent.

<Step S4>

Step S4 is a process to fold the mesh-sheet base material 11 at the both ends of the insulating layers 5, 5, . . . formed in the Step S1 as creases. In Step S4, for instance, after Step S3, by folding the mesh-sheet base material 11 at the both ends of the insulating layers 5, 5, . . . as creases, the plurality of laminated bodies 4, 4, . . . can be stacked such that the facing cathode layers 1, 1 or the facing anode layers 2, 2 of the neighboring laminated bodies 4, 4 are in contact with each other.

<Step S5>

Step S5 is a process to arrange the first current collector 6 to be in contact with the cathode layers 1, 1, . . . formed in Step S3 but not to be in contact with the anode layers 2, 2, . . . also formed in Step S3; while, it is also a process to arrange the second current collector 7 to be in contact with the anode layers 2, 2, . . . formed in Step S3 but not to be in contact with the cathode layers 1, 1, . . . also formed in Step S3. Step S5, for instance, includes the steps of: arranging the second current collector 7 in a housing (not shown. Hereinafter, same as this.) at the bottom of which a current collecting portion 9 is disposed; introducing the structure produced in the Step S4 into the housing; arranging the first current collector 6 on the upper surface of the structure introduced into the housing; and finally disposing the current collecting portion 9 on the first current collector 6.

According to the method for manufacturing the all-solid-state battery having the above Steps S1 to S5, for example, by introducing a step, between Steps S3 and S4, for forming layers 8a, 8a to the upper surface and the lower surface of solid electrolyte layers 3, 3 formed at both ends in the longitudinal direction of the mesh-sheet base material 11, it is possible to manufacture the all-solid-state battery 10. As above, the all-solid--state battery 10 can enhance power density and inhibit increase of fastening force; thereby the present invention can provide a method for manufacturing the all-solid-state battery which can enhance the power density and inhibit increase of fastening force.

The mesh-sheet base material 11 used for the method for manufacturing the all-solid-state battery of the invention has a function to supplement the tensile strength of the solid electrolyte layers 3, 3, . . . imparted at a time of folding up into bellows in Step S4. Moreover, since lithium ions pass through the solid electrolyte layers 3, 3, . . . formed on the mesh-sheet base material 11, the mesh-sheet base material 11 has pores which allow the lithium ions to pass. Specific examples of composing material for the mesh-sheet base material 11 include: polypropylene (PP), polyethylene (PE), and polyethylene terephthalate (PET). It should be noted that although the above description related to the method for manufacturing the all-solid-state battery of the invention shows a mode using the mesh-sheet base material 11, the present invention is not limited to the mode. The base material, on which the insulating layers 5, 5, . . . , the solid electrolyte layers 3, 3, . . . , the cathode layers 1, 1, . . . , and the anode layers 2, 2, . . . are formed, at least has pores which allows lithium ions to pass, maintains the solid state thereof during the manufacturing process of the all-solid-state battery 10, and are composed of members capable of enduring environment at the operation of all-solid-state battery. Another mode of the base material used in the method for manufacturing the all-solid-state battery of the invention may be a sheet-type base material or a long-rolled base material each of which has a plurality of slit-type pores.

In the above description related to the method for manufacturing the all-solid-state battery of the invention, although the mode including Step S2 for forming the solid electrolyte layers 3, 3, . . . only at areas where the insulating layers 5, 5, . . . are not formed, the method for manufacturing the all-solid-state battery of the invention is not limited to the mode. In the method of the invention, it is possible to form the solid electrolyte layer 3 over the entire surface including the insulating layers 5, 5, . . . .

In addition, although the above description related to the method for manufacturing the all-solid-state battery of the invention shows a mode including Step S3 for forming, at intervals, all the cathode layers 1, 1 each constituting the neighboring two laminated bodies 4, 4, the method of the invention is not specifically limited to the mode. It is also possible to have a mode of the method for manufacturing the all-solid-state battery of the invention having Step S3 for forming the cathode layers 1, 1, . . . even on the surface of insulating layer 5 (see the area shown by X in FIG. 3.) supposed to be in contact with the pair of cathode layers 1, 1 when folded in Step S4. In view of providing an all-solid-state battery having a mode which can easily match the capacity of the cathode layer and the anode layer, it is preferable for the method to include Step S3 for forming the cathode layers 1, 1, . . . only on one side of the solid electrolyte layers 3, 3, . . . formed between the insulating layers 5, 5, . . . .

Further, in the description related to the method for manufacturing the all-solid-state battery of the invention shows a mode including Step S3 for forming, at intervals, all the anode layers 2, 2 each constituting the neighboring two laminated bodies 4, 4, the method of the invention is not specifically limited to the mode. It is also possible to have a mode of the method for manufacturing the all-solid-state battery of the invention having Step S3 for forming the anode layers 2, 2, . . . even on the surface of insulating layer 5 (see the area shown by Y in FIG. 3.) supposed to be in contact with the pair of anode layers 2, 2 when folded in Step S4. In view of providing an all-solid-state battery having a mode which can easily match the capacity of the cathode layer and the anode layer, it is preferable for the method to include Step S3 for forming the anode layers 2, 2, . . . only on the other side of the solid electrolyte layers 3, 3, . . . formed between the insulating layers 5, 5, . . . .

Still further, although the above description related to the all-solid-state battery 10 and the method for manufacturing the all-solid-state battery of the present invention show modes including cathode layers 1, 1, . . . and anode layers 2, 2, . . . containing the active material and solid electrolyte, the invention is not limited by these modes. In the all-solid-state battery and the manufacturing method of the invention, for example, it is possible to have a mode including anode layers composed by indium (In) foil.

The above has described the present invention associated with the all-solid-state battery having solid electrolyte layers and the manufacturing method of the invention. By giving necessary modification to the structure of all-solid-state battery of the invention and to the technical ideas related to manufacturing method of all-solid-state battery, the invention can be adequately used for a secondary batteries having non-aqueous electrolytic solution. For example, about the all-solid-state battery 10, in the case of laminating a structure sandwiched between the pair of current collecting portion 9, 9, it is not essential to introduce the current collecting portion 9 between the neighboring structure; however, in the case of applying a technical idea of the all-solid-state battery of the invention to a secondary battery having a non-aqueous electrolytic solution, it is necessary to introduce, between neighboring structures, a member functions as separator of ions. Moreover, in the case where the technical idea related to the manufacturing method of the all-solid-state battery of the invention is adopted to the manufacturing method of the secondary battery having a non-aqueous electrolytic solution, for instance, to prevent depletion of the electrolytic solution, it is necessary to make the cathode layers, the anode layers, the first current collectors, and the second current collectors impregnated. Further, when the technical idea related to the manufacturing method of the all-solid-state battery of the invention is adopted to the manufacturing method of the secondary battery having a non-aqueous electrolytic solution, for instance, it is necessary to make rooms at areas of the mesh-sheet base material where the insulating layers are not formed for storing the electrolytic solutions and to form cathode layers and anode layers.

Industrial Applicability

The all-solid-state battery of the present invention can be used for power source of, e.g., electric vehicle and information equipment.

The invention claimed is:

1. An all-solid-state battery comprising a plurality of laminated bodies each of which comprises: a cathode layer; an anode layer; and a solid electrolyte layer arranged between the cathode layer and the anode layer,
   wherein, when a couple of neighboring laminated bodies optionally selected from the plurality of laminated bodies are defined as a first laminated body and a second laminated body respectively, the plurality of laminated bodies are laminated such that the cathode layer of the first laminated body and the cathode layer of the second laminated body are in direct contact with each other, or such that the anode layer of the first laminated body and the anode layer of the second laminated body are in direct contact with each other,
   a first current collector and a second current collector are respectively arranged on lateral sides of the couple of laminated bodies,
   the first current collector is connected with the cathode layer of the laminated bodies but insulated from the anode layer of the laminated bodies, and
   the second current collector is connected with the anode layer of the laminated bodies but insulated from the cathode layer of the laminated bodies.

2. A method for manufacturing all-solid-state battery comprising the steps of:
   forming a plurality of insulating layers on a base material at intervals;
   after forming the insulating layers, forming a plurality of electrolyte layers in at least a plurality of gaps between the neighboring insulating layers;
   after forming the electrolyte layers, forming electrode layers, wherein a plurality of cathode layers are formed at intervals on one side of the base material including a surface of the solid electrolyte layer formed between the plurality of insulating layers, a plurality of anode layers are formed at intervals on the other side of the base material including the surface of the solid electrolyte layer formed between the plurality of insulating layers;
   folding the base material at the both ends of the insulating layers as creases; and
   arranging current collectors, wherein a first current collector is arranged to be in contact with the cathode layer but not to be in contact with the anode layer and a second current collector is arranged to be in contact with the anode layer but not to be in contact with the cathode layer.

3. The all-solid-state battery according to claim 1, wherein the solid electrolyte layer of the first laminated body and the solid electrolyte layer of the second laminated body are connected through an insulating layer, and a plurality of insulating layers connected to the solid electrolyte layers are arranged between the cathode layer and the second current collector and between the anode layer and the first current collector.

4. A method for manufacturing an all-solid-state battery comprising the steps of:
   forming a plurality of insulating layers on a base material at intervals;
   after forming the insulating layers, forming a plurality of solid electrolyte layers respectively in the intervals;
   after forming the electrolyte layers, forming a plurality of laminated bodies, wherein a plurality of cathode layers are respectively formed on the obverse surface of the electrolyte layers, and a plurality of anode layers are respectively formed on the reverse surface of the electrolyte layers, thereby the laminated bodies respectively comprising the electrolyte layer arranged between the cathode layer and the anode layer;
   folding the insulating layer such that the cathode layers neighboring to each other are in direct contact with each other, or such that the anode layers neighboring to each other are in direct contact with each other; and
   arranging current collectors on lateral sides of one or more of the neighboring laminated bodies optionally selected from the plurality of laminated bodies, wherein a first current collector is arranged to be in contact with the cathode layer but to be insulated from the anode layer, and a second current collector is arranged to be in contact with the anode layer but to be insulated from the cathode layer.

* * * * *